United States Patent
Haas et al.

(10) Patent No.: US 8,825,617 B2
(45) Date of Patent: Sep. 2, 2014

(54) LIMITING DEDUPLICATION BASED ON PREDETERMINED CRITERIA

(75) Inventors: Robert Haas, Adilswil (CH); Nils Haustein, Soergenloch (DE); Craig Anthony Klein, Tucson, AZ (US); Ulf Troppens, Mainz (DE); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 12/049,186

(22) Filed: Mar. 14, 2008

(65) Prior Publication Data

US 2009/0234795 A1 Sep. 17, 2009

(51) Int. Cl.
*G06F 7/00* (2006.01)

(52) U.S. Cl.
USPC ............................................. 707/705

(58) Field of Classification Search
None
See application file for complete search history.

(56) References Cited

U.S. PATENT DOCUMENTS

| | | | | |
|---|---|---|---|---|
| 7,092,956 B2 * | 8/2006 | Ruediger | | 707/602 |
| 7,103,602 B2 * | 9/2006 | Black et al. | | 707/825 |
| 7,301,448 B1 * | 11/2007 | Usery et al. | | 340/506 |
| 7,472,242 B1 * | 12/2008 | Deshmukh et al. | | 711/162 |
| 7,519,635 B1 * | 4/2009 | Haustein et al. | | 1/1 |
| 7,539,710 B1 * | 5/2009 | Haustein et al. | | 1/1 |
| 7,669,023 B2 * | 2/2010 | Murase | | 711/162 |
| 7,672,942 B2 * | 3/2010 | Weinberg et al. | | 1/1 |
| 7,720,892 B1 * | 5/2010 | Healey et al. | | 707/831 |
| 7,949,637 B1 * | 5/2011 | Burke | | 707/655 |
| 2004/0208186 A1 * | 10/2004 | Eichen et al. | | 370/401 |
| 2008/0184001 A1 * | 7/2008 | Stager | | 711/167 |
| 2009/0007261 A1 * | 1/2009 | Smith | | 726/21 |
| 2009/0089483 A1 * | 4/2009 | Tanaka et al. | | 711/103 |
| 2009/0132619 A1 * | 5/2009 | Arakawa et al. | | 707/205 |
| 2009/0204636 A1 * | 8/2009 | Li et al. | | 707/103 Y |

OTHER PUBLICATIONS

Hu Youshida, Pre, Post and In line Deduplication Ratios, Mar. 2, 2008, pp. 1-3.*
"Adaptive Lossless Data Compression Algorithm", ECMA, Jun. 1995, http://www.ecma.ch.
J. Nakajima, et al., "Performance Analysis and Parallel Implementation of Dedicated Hash Functions", Mitsubishi Electric Corporation, Proceedings of Eurocrypt 2002, pp. 165-180, http://www.iacr.org/archive/eurocrypt2002/23320159/hash.pdf.
A. Osuna, "IBM System Storage N Series A-SIS Deduplication Deployment and Implementation Guide", IBM Corp., Redpaper, 2007.
US Application entitled "Ordering Compression and Deduplication of Data", serial No. unknown, filed Mar. 14, 2008, by inventors A.K. Bates, N. Haustein, G.A. Klein, and Daniel J. Winarski.

* cited by examiner

*Primary Examiner* — Etienne Leroux
*Assistant Examiner* — Thu Nga Nguyen
(74) *Attorney, Agent, or Firm* — Rabindranath Dutta; Konrad Raynes Davda & Victor LLP

(57) ABSTRACT

Data for deduplication is received. The received data is deduplicated if selected conditions corresponding to the deduplication are satisfied, wherein the selected conditions include a deduplication ratio, a data deduplication threshold, and a data quiescence measure. Deduplication of the received data is discontinued if the selected conditions corresponding to the deduplication are not satisfied.

16 Claims, 6 Drawing Sheets

LIMITING DEDUPLICATION BASED ON PREDETERMINED CRITERIA

BACKGROUND

1. Field

The disclosure relates to a method, system, and article of manufacture for limiting deduplication based on predetermined criteria.

2. Background

Data deduplication which is also known as single instance store or data folding refers to the process of eliminating or significantly reducing multiple copies of the same data. For example, data deduplication may eliminate duplicate files in a storage system or may remove duplicate portions of a single file. Certain exemplary data deduplication mechanisms may offer the promise of a twenty fold reduction of stored data, by identifying repetitive storage of identical data and eliminating all but one copy of the identical data.

SUMMARY OF THE PREFERRED EMBODIMENTS

Provided are a method, system, and article of manufacture, wherein data for deduplication is received. The received data is deduplicated if selected conditions corresponding to the deduplication are satisfied, wherein the selected conditions include a deduplication ratio, a data deduplication threshold, and a data quiescence measure. Deduplication of the received data is discontinued if the selected conditions corresponding to the deduplication are not satisfied.

In additional embodiments, the deduplication of the received data is initiated, in response to determining that the received data has been quiescent at least for a period of time indicated in the data quiescence measure. A determination is made that an amount of deduplicated data exceeds the data deduplication threshold. Deduplication of the received data is continued, in response to determining that the deduplicated data has achieved the deduplication ratio.

In yet additional embodiments, the data quiescence measure corresponds to at least one criterion selected from a plurality of criteria comprising: (i) an amount of time the data has been quiescent; (ii) how recently the data has been used; (iii) a frequency of usage of the data; and (iv) elapsed time since last change to the data.

In further embodiments, processing load for the deduplication is reduced by: (i) limiting deduplication when the deduplication ratio cannot be achieved; and (ii) limiting deduplication when the data is changing too frequently for deduplication to be useful in accordance with a user indicated criterion included in the data quiescence measure.

In yet further embodiments, an amount of utilization of a processing unit that performs the deduplication is also used to determine whether or not to continue the deduplication of the data.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

While data deduplication may offer the promise of a certain predetermined amount of reduction, not all data may experience the predetermined amount of reduction. In fact, some data may not experience any reduction at all. Also, some data may change too frequently to warrant the processing and resource overhead of deduplication. Certain embodiments provide a user selectable threshold for data to be deduplicated, once the data is quiescent. If after the user selectable threshold has been reached, a user selectable deduplication ratio has not been met, then further data deduplication may be blocked as an inefficient use of control unit resources.

Exemplary Embodiments

Figure 1:
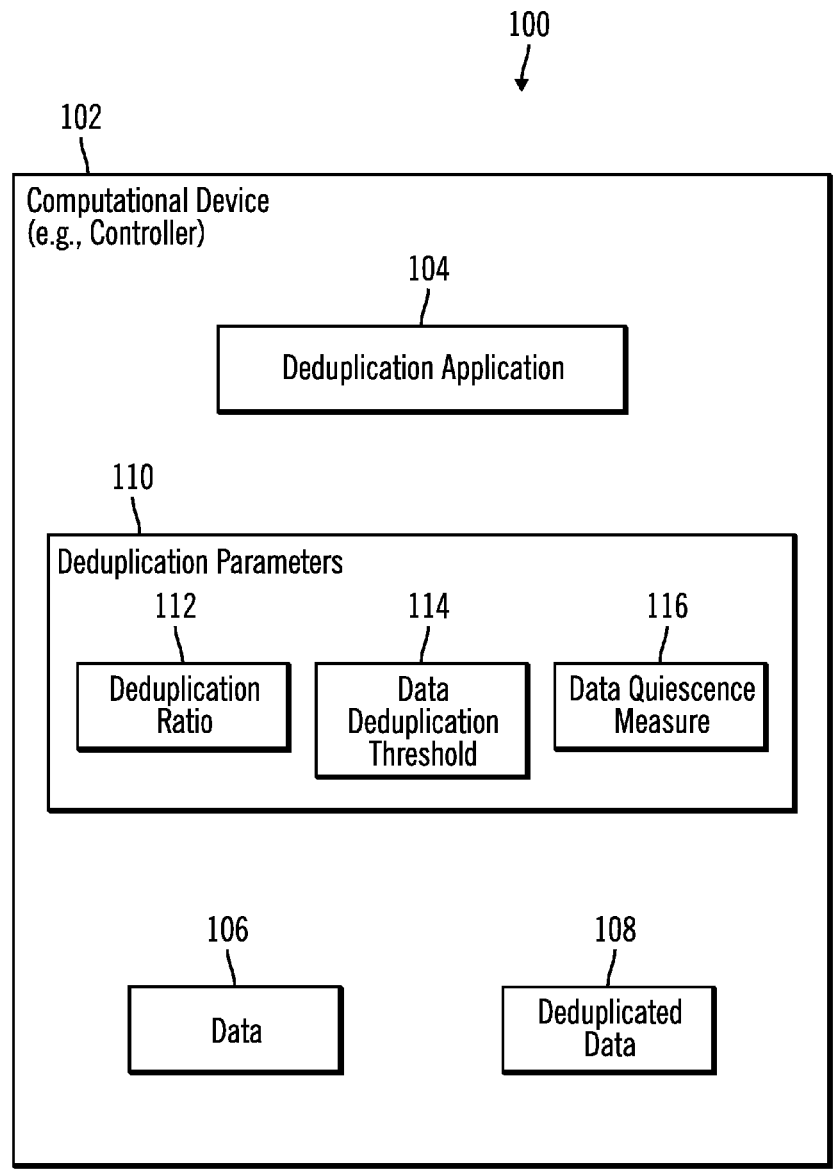
FIG. 1 illustrates a block diagram of a computing environment in which a computational device that includes a deduplication application is shown, in accordance with certain embodiments.

FIG. 1 illustrates a block diagram of a computing environment 100 in which a computational device 102 that includes a deduplication application 104 is shown, in accordance with certain embodiments.

The computational device 102 may be any suitable device including those presently known in the art, such as, a personal computer, a workstation, a server, a mainframe, a hand held computer, a palm top computer, a telephony device, a network appliance, a blade computer, a storage server, etc. The deduplication application 104 may be implemented in hardware, software, firmware or any combination thereof in the computational device 102.

The deduplication application 104 may be applied to the data 106 to generate deduplicated data 108, based on a set of deduplication parameters 110, wherein the deduplication parameters 110 may include a deduplication ratio 112, a data deduplication threshold 114, and a data quiescence measure 116.

Figure 2:
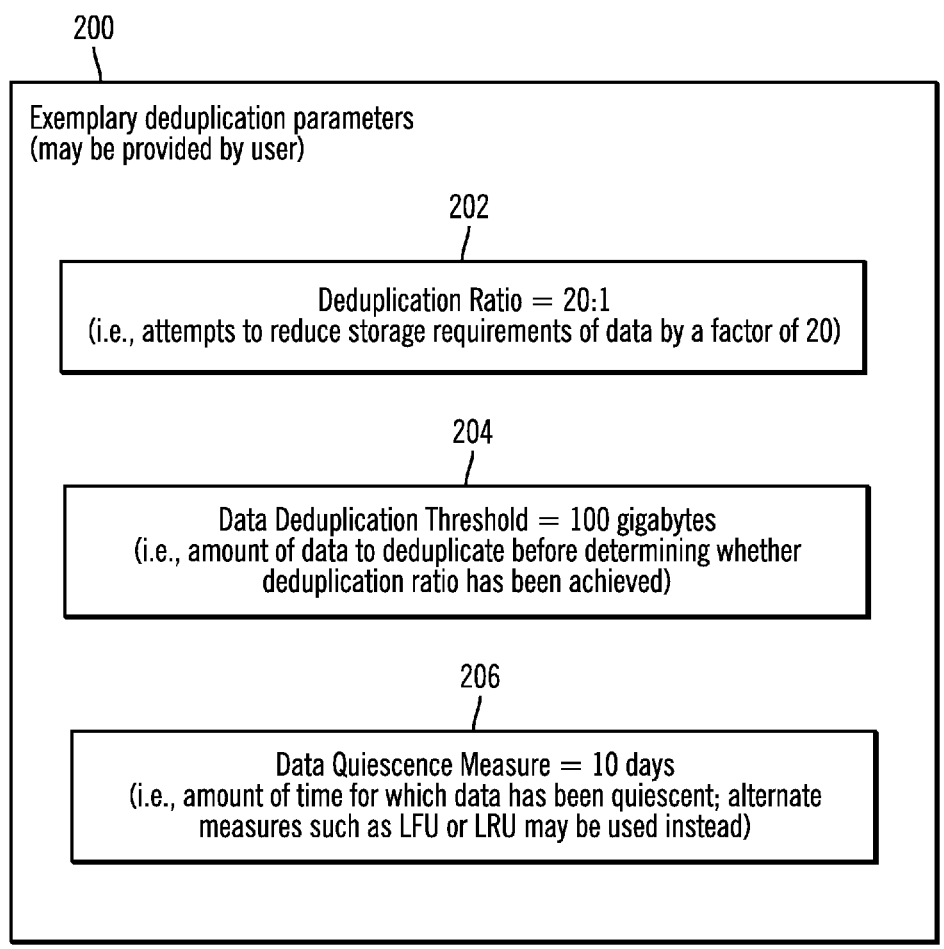
FIG. 2 shows a block diagram of exemplary deduplication parameters, in accordance with certain embodiments.

FIG. 2 shows a block diagram of exemplary deduplication parameters 200, in accordance with certain embodiments. The exemplary deduplication parameters 200 shown in FIG. 2 may be an instance of the deduplication parameters 110 of FIG. 1.

The exemplary deduplication parameters 200 may be provided by a user or may be predetermined and may include a deduplication ratio 202, a data deduplication threshold 204, and a data quiescence measure 206. In certain embodiments, a table or other data structure corresponding to the exemplary deduplication parameters 200 may be shown as a display on the screen for user interaction.

In certain exemplary embodiments, the deduplication ratio is set to 20:1, i.e., the deduplication application 104 attempts to reduce storage requirements for the data 106 by a factor of 20 while generating the deduplicated data 108. Also, in certain exemplary embodiments the data deduplication threshold is set to be 100 gigabytes, i.e., the deduplication application 104 attempts to deduplicate 100 gigabytes of data before determining whether the deduplication ratio 202 has been achieved. Additionally, in certain embodiments the data quiescence measure 206 is set to be 10 days, i.e., the deduplication application 104 attempts to deduplicate data that has been quiescent, i.e., not used, for over 10 days. While FIG. 2 shows a data quiescence measure 206 based on an age stamp of time, other measures of quiescence may include measures based on the time since the last update or change to the data, the data least frequently used (LFU), or the data least recently used (LRU).

Figure 3:
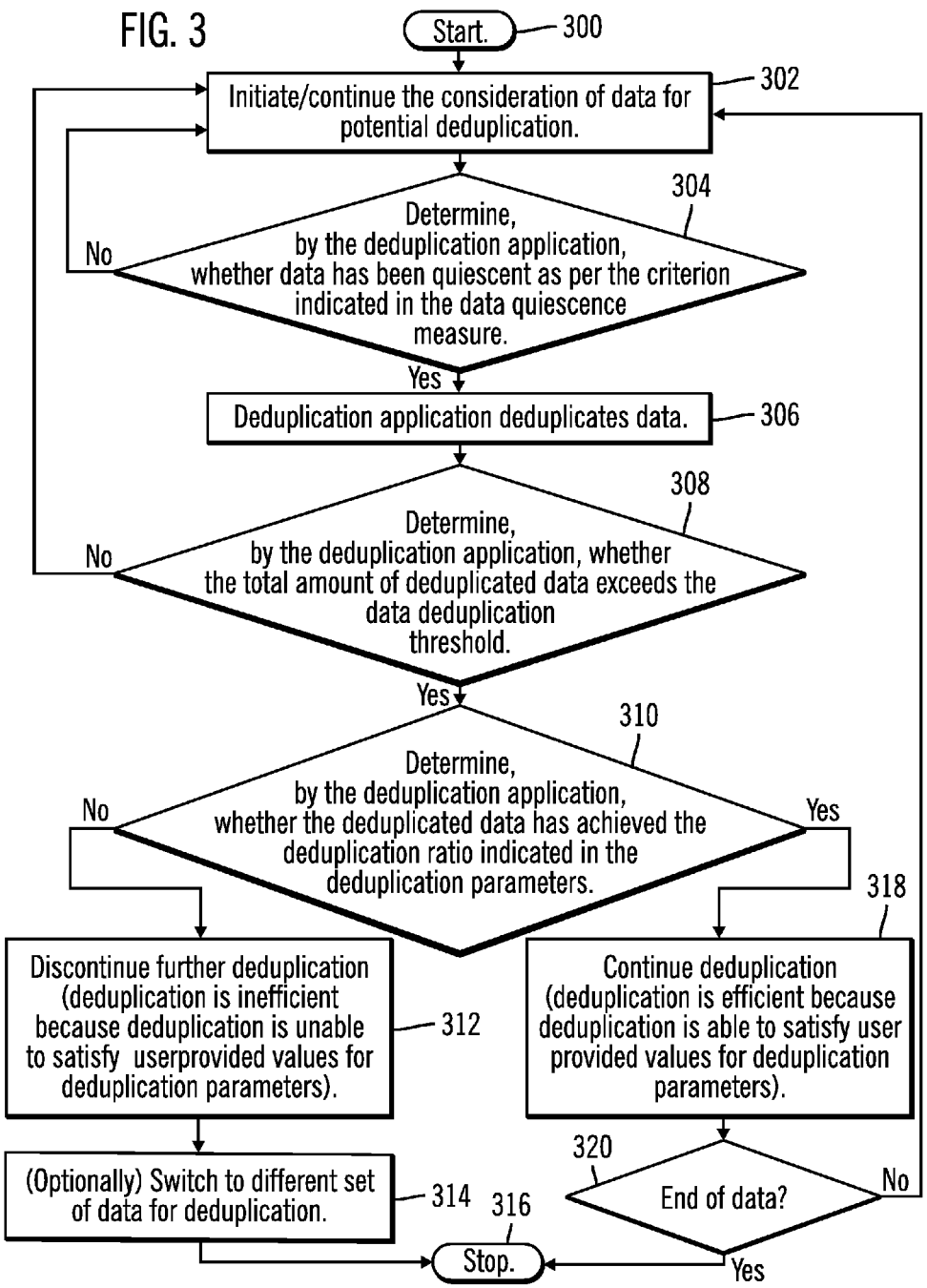
FIG. 3 illustrates a first set of operations for limiting deduplication based on a set of predetermined criteria, in accordance with certain embodiments.

FIG. 3 illustrates a first set of operations for limiting deduplication based on a set of predetermined criteria such as those provided by the deduplication parameters 110, 200, in accordance with certain embodiments.

Control starts at block 300 and proceeds to block 302 where the deduplication application 104 initiates the consideration of data for potential deduplication. Control proceeds to block 304 where the deduplication application 104 determines whether data has been quiescent as per the criterion indicated in the data quiescence measure 116. If so, then the deduplication application 104 deduplicates (at block 306) data. If not, control returns to block 302. Therefore, in certain embodiments in which the data quiescence measure is indicated to be 10 days (as in block 206 of FIG. 2) the deduplication application 104 deduplicates data that has aged for more than 10 days, i.e., recent data which has a relatively greater likelihood of changing is not deduplicated in order to avoid the processing and resource overhead of deduplication.

Control proceeds to block 308 where the deduplication application 104 determines whether the total amount of deduplicated data exceeds the data deduplication threshold 114 indicated in the deduplication parameters 110. If so, then the deduplication application 104 determines (at block 310) whether the deduplicated data has achieved the deduplication ratio 112 indicated in the deduplication parameters 110. If at block 308, it is determined that the total amount of deduplicated data does not exceed the data deduplication threshold 114 indicated in the deduplication parameters 110, control returns to block 302 from block 308.

If at block 310 a determination is made that the deduplicated data has not achieved the deduplication ratio 112 indicated in the deduplication parameters 110, then further deduplication is discontinued (at block 312) because further deduplication is inefficient (as deduplication is unable to satisfy the user provided values in the deduplication parameters 110). Control proceeds to block 314, and a different set of data may be considered for deduplication, before stopping (at block 316) the process shown in FIG. 3.

If at block 310, a determination is made that the deduplicated data has achieved the deduplication ratio 112 indicated in the deduplication parameters 110 then the deduplication application 104 continues (at block 318) to deduplicate data because the deduplication is efficient (as deduplication is able to satisfy user provided values for the deduplication parameters 110). Control proceeds to block 320, where a determination is made as to whether end of data has been reached and if so the process shown in FIG. 3 stops (at block 316). Otherwise, control returns to block 302 where the consideration of data for potential deduplication is continued.

Therefore, FIG. 3 illustrates certain embodiments in which deduplication is abandoned as an inefficient process and an unnecessary consumption of valuable controller resources when user specified deduplication parameters 110 are not satisfied. The process described in FIG. 3 may be invoked: (a) for every data file; (b) once for every type of data (spreadsheet, word processing document, etc.); (c) or once every time period, such as, once an hour, once a day, etc. The process described in FIG. 3 is designed to deduplicate data where such deduplication is worth the usage of processor and memory resources in the computational device 102, and block the deduplication when there is no meaningful return on the usage of the processor and memory resources in the computational device 102. The process described in FIG. 3 may be invoked once for every data file in certain embodiments where large files are present.

Figure 4:
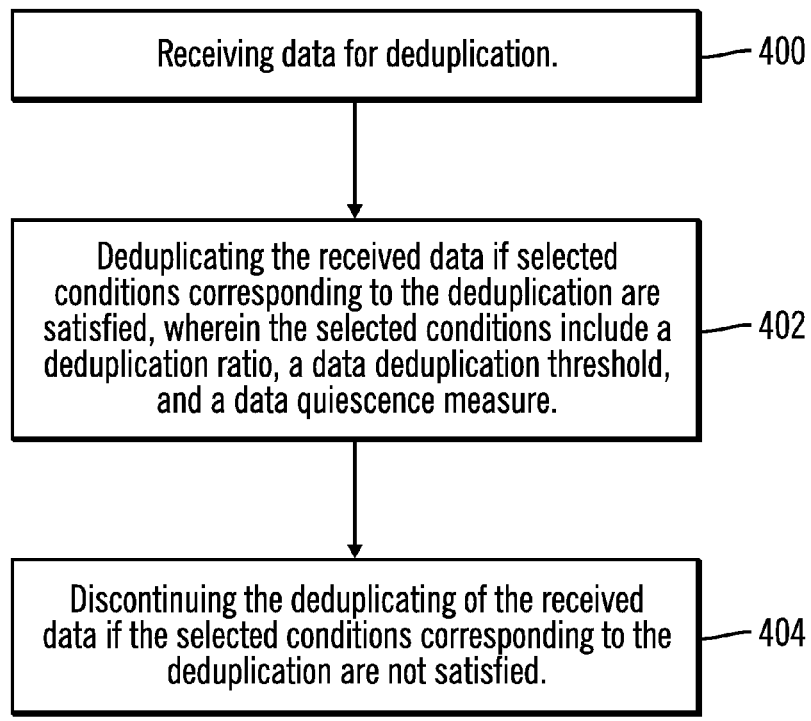
FIG. 4 illustrates a second set of operations for limiting deduplication based on selected conditions corresponding to the deduplication being satisfied, in accordance with certain embodiments.

FIG. 4 illustrates a second set of operations for limiting deduplication based on selected conditions corresponding to the deduplication being satisfied, in accordance with certain embodiments.

Control starts at block 400, where the deduplication application 104 receives data 106 for deduplication. The deduplication application 104 deduplicates (at block 402) the received data 106 if selected conditions corresponding to the deduplication are satisfied, wherein the selected conditions include a deduplication ratio 112, a data deduplication threshold 114, and a data quiescence measure 116. The deduplication application 104 discontinues (at block 404) the deduplicating of the received data if the selected conditions corresponding to the deduplication are not satisfied.

Figure 5:
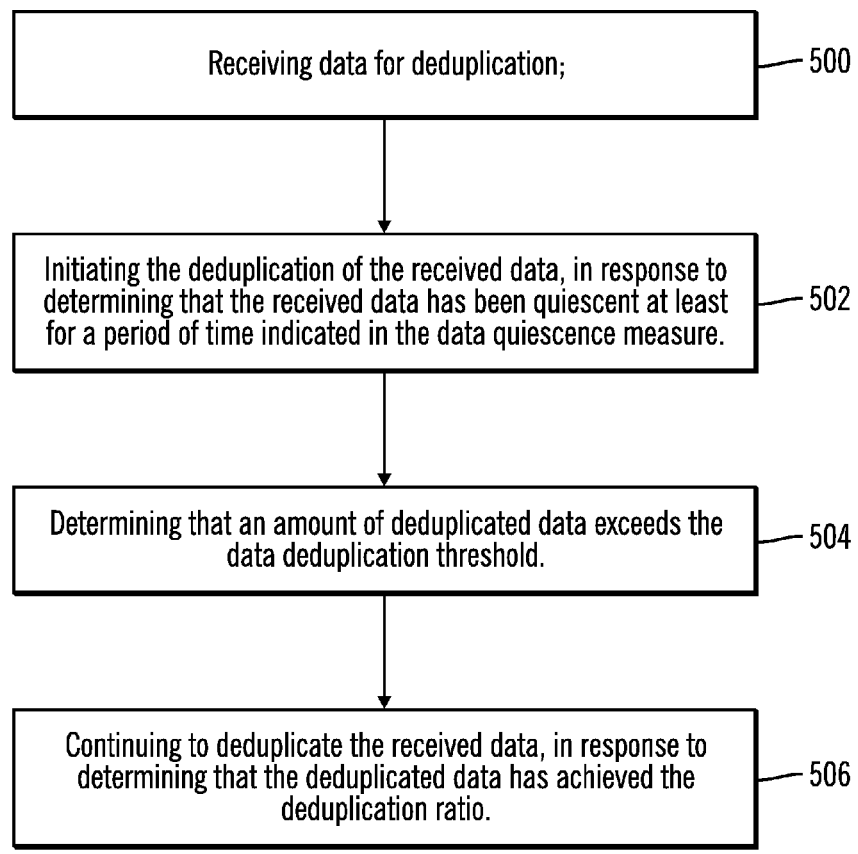
FIG. 5 illustrates a third set of operations for limiting deduplication based on selected conditions, such as a data quiescence measure, a data deduplication threshold, and a deduplication ratio, in accordance with certain embodiments.

FIG. 5 illustrates a third set of operations for limiting deduplication based on selected conditions, such as a data quiescence measure 116, a data deduplication threshold 114, and a deduplication ratio 112, in accordance with certain embodiments.

Control starts at block 500, where the deduplication application 104 receives data 106 for deduplication. The deduplication application 104 initiates (at block 502) the deduplication of the received data 106, in response to determining that the received data has been quiescent at least for a period of time indicated in the data quiescence measure 116.

Subsequently, at block 504, the deduplication application 104 determines that an amount of deduplicated data exceeds the data deduplication threshold 114. The deduplication application continues (at block 506) to deduplicate the received data, in response to determining that the deduplicated data has achieved the deduplication ratio 112.

Therefore, certain embodiments continue to perform deduplication when deduplication parameters 110 indicated by a user are satisfied, and terminate deduplication when the deduplication parameters 110 indicated by a user are not satisfied. As a result, unnecessary consumption of resources in the computational device 102 are avoided when deduplication is not particularly useful as per the duplication parameters 110 provided by the user.

Alternative Embodiment

As an alternate embodiment, the deduplication process may have to exceed a threshold of X1:1 if the utilization of the control unit (such as the computational device 102) performing the deduplication is above U1, otherwise deduplication is abandoned as inefficient. As the control unit utilization rises to U2>U1, the deduplication ratio may have to exceed X2>X1, in order for the deduplication to be allowed to proceed. In other words, the deduplication would have to be increasingly more efficient, as the utilization of the control unit rises, in order to command the resources of the increasingly burdened control unit.

Control Unit utilization U is the ratio between the current usage of the control unit and its maximum design usage. Thus, 0<U<1. One equation for the "go/no-go" deduplication ratio could involve the current control unit utilization in the form (1+N*U):1 as the go/no-go deduplication ratio, where N is a user-selectable integer. For example, if the control unit's utilization is 0.8 (80%), and N is selected to be 10, the deduplication ratio would have to exceed 9:1 (1+10*0.8) to be worth the expenditure of valuable control unit resources.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 6:
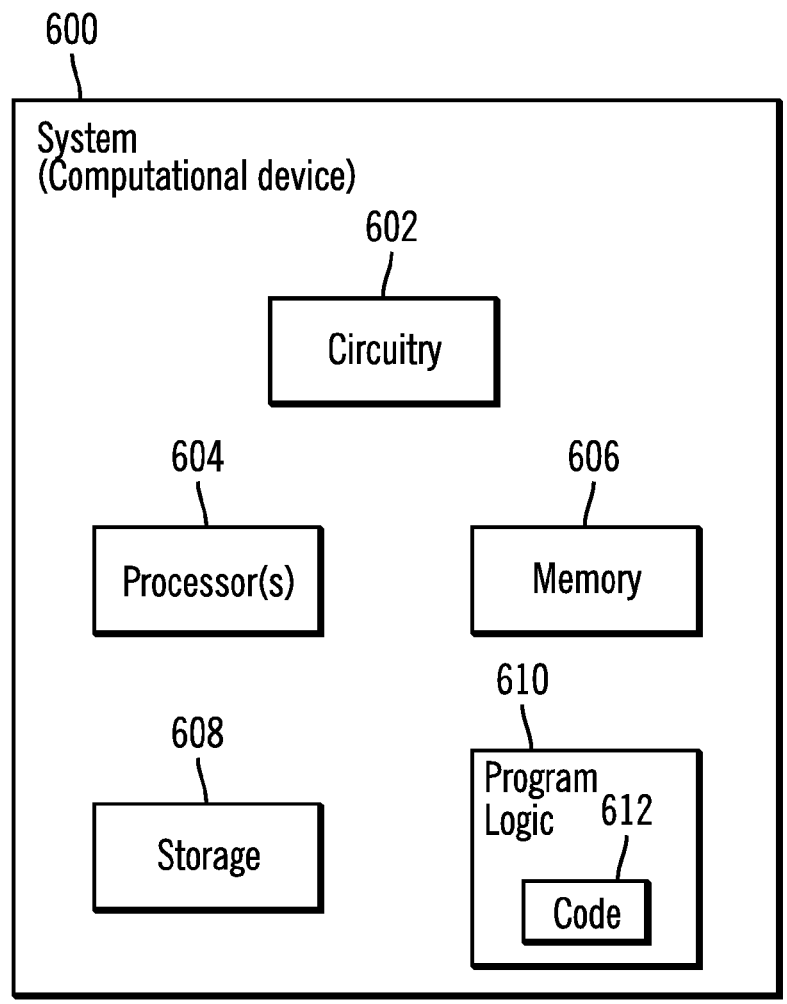
FIG. 6 illustrates a block diagram that shows certain elements that may be included in the computational device of FIG. 1, in accordance with certain embodiments.

FIG. 6 illustrates a block diagram that shows certain elements that may be included in computational device 102 in accordance with certain embodiments, where the computational device 102 may also be referred to as a system 600, and may include a circuitry 602 that may in certain embodiments include a processor 604. The system 600 may also include a memory 606 (e.g., a volatile memory device), and storage 608. The storage 608 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 608 may comprise an internal storage device, an attached storage device and/or a network accessible storage device. The system 600 may include a program logic 610 including code 612 that may be loaded into the memory 606 and executed by the processor 604 or circuitry 602. In certain embodiments, the program logic 610 including code 612 may be stored in the storage 608. In certain other embodiments, the program logic 610 may be implemented in the circuitry 602. Therefore, while FIG. 6 shows the program logic 610 separately from the other elements, the program logic 610 may be implemented in the memory 606 and/or the circuitry 602.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-6 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-6 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
   receiving, by a processor, data for deduplication, wherein a deduplication ratio is a factor by which storage requirements of the received data are to be reduced and a data deduplication threshold is a selected amount of the received data that is deduplicated to determine whether the deduplication ratio is achievable for the received data, and wherein the deduplication ratio is set such that an attempt is made to reduce storage requirements of the data by at least a factor of 20;
   determining whether the received data the received data has been quiescent at least for a period of time indicated in a data quiescence measure, wherein the period of time indicated in the data quiescence measure is at least a plurality of days;
   in response to determining that the received data has been quiescent for at least the period of time indicated in the data quiescence measure, performing:
   deduplicating the selected amount of the received data to generate an amount of deduplicated data;
   determining whether the generated amount of deduplicated data exceeds the data deduplication threshold, wherein the data duplication threshold is set to be at least 100 gigabytes;
   in response to determining that the generated amount of deduplicated data exceeds the data deduplication threshold, determining whether the generated amount of deduplicated data has achieved the deduplication ratio; and
   in response to determining that the generated amount of deduplicated data has not achieved the deduplication ratio, discontinuing the deduplicating of the received data and switching to a different set of data for deduplication; and
   in response to determining that the received data has not been quiescent for at least the period of time indicated in the data quiescence measure, receiving additional data for deduplication, and wherein deduplication of the data is abandoned when user specified deduplication parameters including the deduplication ratio, the data quiescence measure, and the data duplication threshold are not satisfied.

2. The method of claim 1, wherein an amount of utilization of a processing unit that performs the deduplication is also used to determine whether or not to continue the deduplication of the data.

3. A system, comprising:
   a memory; and
   a processor coupled to the memory, wherein the processor performs operations, the operations comprising:
   receiving data for deduplication, wherein a deduplication ratio is a factor by which storage requirements of the received data are to be reduced and a data deduplication threshold is a selected amount of the received data that is deduplicated to determine whether the deduplication ratio is achievable for the received data, and wherein the deduplication ratio is set such that an attempt is made to reduce storage requirements of the data by at least a factor of 20;
   determining whether the received data the received data has been quiescent at least for a period of time indicated in a data quiescence measure, wherein the period of time indicated in the data quiescence measure is at least a plurality of days;
   in response to determining that the received data has been quiescent for at least the period of time indicated in the data quiescence measure, performing:
   deduplicating the selected amount of the received data to generate an amount of deduplicated data;
   determining whether the generated amount of deduplicated data exceeds the data deduplication threshold, wherein the data duplication threshold is set to be at least 100 gigabytes;
   in response to determining that the generated amount of deduplicated data exceeds the data deduplication threshold, determining whether the generated amount of deduplicated data has achieved the deduplication ratio; and
   in response to determining that the generated amount of deduplicated data has not achieved the deduplication ratio, discontinuing the deduplicating of the received data and switching to a different set of data for deduplication; and
   in response to determining that the received data has not been quiescent for at least the period of time indicated in the data quiescence measure, receiving additional data for deduplication, and wherein deduplication of the data is abandoned when user specified deduplication parameters including the deduplication ratio, the data quiescence measure, and the data duplication threshold are not satisfied.

4. The system of claim 3, wherein an amount of utilization of a processing unit that performs the deduplication is also used to determine whether or not to continue the deduplication of the data.

5. An article of manufacture including code, wherein the code when executed on a processor performs operations, the operations comprising:

receiving, by the processor, data for deduplication, wherein a deduplication ratio is a factor by which storage requirements of the received data are to be reduced and a data deduplication threshold is a selected amount of the received data that is deduplicated to determine whether the deduplication ratio is achievable for the received data, and wherein the deduplication ratio is set such that an attempt is made to reduce storage requirements of the data by at least a factor of 20;

determining, by the processor, whether the received data the received data has been quiescent at least for a period of time indicated in a data quiescence measure, wherein the period of time indicated in the data quiescence measure is at least a plurality of days;

in response to determining, by the processor, that the received data has been quiescent for at least the period of time indicated in the data quiescence measure, performing:

deduplicating the selected amount of the received data to generate an amount of deduplicated data;

determining whether the generated amount of deduplicated data exceeds the data deduplication threshold, wherein the data duplication threshold is set to be at least 100 gigabytes;

in response to determining that the generated amount of deduplicated data exceeds the data deduplication threshold, determining whether the generated amount of deduplicated data has achieved the deduplication ratio; and in response to determining that the generated amount of deduplicated data has not achieved the deduplication ratio, discontinuing the deduplicating of the received data and switching to a different set of data for deduplication; and in response to determining, by the processor, that the received data has not been quiescent for at least the period of time indicated in the data quiescence measure, receiving additional data for deduplication, and wherein deduplication of the data is abandoned when user specified deduplication parameters including the deduplication ratio, the data quiescence measure, and the data duplication threshold are not satisfied.

6. The article of manufacture of claim 5, wherein an amount of utilization of a processing unit that performs the deduplication is also used to determine whether or not to continue the deduplication of the data.

7. A method for deploying computing infrastructure, comprising integrating machine-readable code into a machine, wherein the code in combination with the machine is capable of performing:

receiving data for deduplication, wherein a deduplication ratio is a factor by which storage requirements of the received data are to be reduced and a data deduplication threshold is a selected amount of the received data that is deduplicated to determine whether the deduplication ratio is achievable for the received data, and wherein the deduplication ratio is set such that an attempt is made to reduce storage requirements of the data by at least a factor of 20;

determining whether the received data the received data has been quiescent at least for a period of time indicated in a data quiescence measure, wherein the period of time indicated in the data quiescence measure is at least a plurality of days;

in response to determining that the received data has been quiescent for at least the period of time indicated in the data quiescence measure, performing:

deduplicating the selected amount of the received data to generate an amount of deduplicated data;

determining whether the generated amount of deduplicated data exceeds the data deduplication threshold, wherein the data duplication threshold is set to be at least 100 gigabytes;

in response to determining that the generated amount of deduplicated data exceeds the data deduplication threshold, determining whether the generated amount of deduplicated data has achieved the deduplication ratio; and in response to determining that the generated amount of deduplicated data has not achieved the deduplication ratio, discontinuing the deduplicating of the received data and switching to a different set of data for deduplication; and in response to determining that the received data has not been quiescent for at least the period of time indicated in the data quiescence measure, receiving additional data for deduplication, and wherein deduplication of the data is abandoned when user specified deduplication parameters including the deduplication ratio, the data quiescence measure, and the data duplication threshold are not satisfied.

8. The method for deploying computing infrastructure of claim 7, wherein an amount of utilization of a processing unit that performs the deduplication is also used to determine whether or not to continue the deduplication of the data.

9. The method of claim 2, wherein the deduplication ratio is a function of the amount of utilization of the processing unit and a predetermined number selected by a user.

10. The system of claim 4, wherein the deduplication ratio is a function of the amount of utilization of the processing unit and a predetermined number selected by a user.

11. The article of manufacture of claim 6, wherein the deduplication ratio is a function of the amount of utilization of the processing unit and a predetermined number selected by a user.

12. The method for deploying computing infrastructure of claim 8, wherein the deduplication ratio is a function of the amount of utilization of the processing unit and a predetermined number selected by a user.

13. The method of claim 1, wherein the deduplication of the data is continued when user specified deduplication parameters including the deduplication ratio, the data quiescence measure, and the data duplication threshold are satisfied.

14. The system of claim 3, wherein the deduplication of the data is continued when the user specified deduplication parameters including the deduplication ratio, the data quiescence measure, and the data duplication threshold are satisfied.

15. The article of manufacture of claim 5, wherein the deduplication of the data is continued when the user specified deduplication parameters including the deduplication ratio, the data quiescence measure, and the data duplication threshold are satisfied.

16. The method for deploying computing infrastructure of claim 7, wherein the deduplication of the data is continued when the user specified deduplication parameters including the deduplication ratio, the data quiescence measure, and the data duplication threshold are satisfied.

* * * * *